United States Patent
Gomer et al.

(10) Patent No.: US 11,436,798 B2
(45) Date of Patent: Sep. 6, 2022

(54) MESH DRIVEN STRANDS

(71) Applicant: Electronic Arts Inc., Redwood City, CA (US)

(72) Inventors: Simon Gomer, Stockholm (SE); Jeremy O'Brien, Reading (GB); Andrea Ferrario, Stockholm (SE); Robin Taillandier, Sundbyberg (SE); Leo Taslaman, Stockholm (SE)

(73) Assignee: ELECTRONIC ARTS INC., Redwood City, CA (US)

( * ) Notice: Subject to any disclaimer, the term of this patent is extended or adjusted under 35 U.S.C. 154(b) by 0 days.

(21) Appl. No.: 16/912,309

(22) Filed: Jun. 25, 2020

(65) Prior Publication Data

US 2021/0407193 A1    Dec. 30, 2021

(51) Int. Cl.
  *G06T 17/20*  (2006.01)
  *G06T 1/20*  (2006.01)
  *G06T 15/04*  (2011.01)
  *G06T 13/40*  (2011.01)

(52) U.S. Cl.
  CPC .......... *G06T 17/20* (2013.01); *G06T 1/20* (2013.01); *G06T 13/40* (2013.01); *G06T 15/04* (2013.01)

(58) Field of Classification Search
  CPC .................. G06T 17/20; G06T 13/40
  See application file for complete search history.

(56) References Cited

U.S. PATENT DOCUMENTS

| | | | |
|---|---|---|---|
| 6,720,962 B1* | 4/2004 | Alter | G06T 13/20 |
| | | | 345/420 |
| 10,198,860 B1* | 2/2019 | Smith | G06T 17/205 |
| 10,460,054 B2* | 10/2019 | Meinert | G06N 3/10 |
| 10,685,499 B1* | 6/2020 | Khadiyev | G06T 17/20 |
| 2018/0005428 A1* | 1/2018 | Montero | G06T 15/04 |

OTHER PUBLICATIONS

Huan et al., "Morphing and Repairing a 3D Scalp Geometry in Building Hair Models and Simulation", 978-1-4244-4131-0/09/$25.00 © 2009 IEEE, pp. 1-6 (Year: 2009).*
Ward, Kelly et al., Adaptive Grouping and Subdivision for Simulating Hair Dynamics, http://gamma.cs.unc.edu/HAIR, Proc. of Pacific Graphics, 2003.
Hadap, Sunil et al., Realistic Hair Simulation: Animation and Rendering, Siggraph 2008, May 19, 2008.

* cited by examiner

*Primary Examiner* — Samantha (Yuehan) Wang
(74) *Attorney, Agent, or Firm* — Middleton Reutlinger

(57) ABSTRACT

A computer implemented method comprises receiving a mesh representing a 3D object, the mesh comprising a plurality of 2D shapes, receiving a strand feature comprising a plurality of virtual strands, and associating each strand of the plurality of virtual strands with a 2D shape of the mesh.

15 Claims, 7 Drawing Sheets

MESH DRIVEN STRANDS

BACKGROUND

In computer generated animations, for example in a video game, pluralities of strands, or "strand features", may be used to represent hair features such as, scalp hair or beards of computer-generated characters. Strand features are typically created according to specification, or "authored", by an artist, consistently with a three-dimensional surface mesh that represents a three-dimensional object, such as, the face or the body of characters.

Computer-generated features, such as meshes or strand features, are animated conventionally by fixing, or "skinning", them relative to an underlying structure, composed of one or more virtual "bones", whose movement is driven by an animation, as specified by an animator. For example, a beard may be skinned to a jawbone of a character, for example, and the beard features then move with the transformation of the jawbone. The strands making up the hair feature such as the beard may be authored at a fixed offset from the bone to a position on the surface of the character's head. The movement of the bones will then drive a movement of the strands in the strand feature that are skinned to the bones, using the same, or a combination of, transformations as the bones.

SUMMARY

According to a first aspect, the specification describes a computer implemented method comprising: receiving a mesh representing a 3D object, the mesh comprising a plurality of 2D shapes; receiving a strand feature comprising a plurality of virtual strands; and associating each strand of the plurality of virtual strands with a 2D shape of the mesh.

Associating each strand of the plurality of virtual strands with a 2D shape of the mesh may comprise: determining, for each strand, an intersection shape of the 2D shapes, with which a given strand intersects; determining an intersection location of the intersection shape corresponding to a location at which the given strand intersects the mesh; and storing information identifying the intersection shape and the intersection location together with strand data of the given strand.

The 2D shapes of the mesh may be triangles, and the method may further comprise: determining, for each strand, barycentric coordinates of the intersection shape which represent the intersection location.

The method may further comprise: receiving updated positions and orientations of the 2D shapes of the mesh transformed according to an animation; and updating positions and orientations of the strands in accordance with the updated positions and orientations of the corresponding intersection shape and the intersection location.

The method may further comprise: determining, for each strand, UV coordinates within the UV space of the first mesh corresponding to the intersection shape and intersection location associated with the strand; and storing the UV coordinates together with the strand data of the given strand.

The mesh may be a first mesh authored with a given UV space, and the method may further comprises receiving a second mesh authored with the given UV space, wherein the second mesh comprises a plurality of 2D shapes and is different to the first mesh; determining an intersection shape of the second mesh and an intersection location within the intersection shape corresponding to the stored UV coordinates for each given strand of the strand feature; saving the strand data of the given strand together with information identifying the intersection shape and intersection location of the second mesh; and determining the position of each strand of the strand feature in three-dimensional space in accordance with the position in three-dimensional space of the intersection shape and the intersection location of the second mesh.

According to a second aspect, the specification describes an apparatus comprising one or more processors and a memory, the memory comprising instructions that, when executed by the one or more processors, cause the apparatus to: receive a mesh representing a 3D object, the mesh comprising a plurality of 2D shapes; receive a strand feature comprising a plurality of virtual strands; and associate each strand of the plurality of virtual strands with a 2D shape of the mesh.

Associating each strand of the plurality of virtual strands with a 2D shape of the may mesh may comprise determining, for each strand, an intersection shape of the 2D shapes, with which a given strand intersects; determining an intersection location of the intersection shape corresponding to a location at which the given strand intersects the mesh; and storing information identifying the intersection shape and the intersection location together with strand data of the given strand.

The may memory further comprise instructions which, when executed by the one or more processors, cause the apparatus to: receive updated positions and orientations of the 2D shapes of the mesh transformed according to an animation; and update positions and orientations of the strands in accordance with the updated positions and orientations of the corresponding intersection shape and the intersection location.

The memory further comprise instructions which, when executed by the one or more processors, cause the apparatus to: determine, for each strand, UV coordinates within the UV space of the first mesh corresponding to the intersection shape and intersection location associated with the strand; and store the UV coordinates together with the strand data of the given strand.

The mesh may be a first mesh authored with a given UV space, and the memory may further comprise instructions which, when executed by the one or more processors, cause the apparatus to: receive a second mesh authored with the given UV space, wherein the second mesh comprises a plurality of 2D shapes and is different to the first mesh; determine an intersection shape of the second mesh and an intersection location within the intersection shape corresponding to the stored UV coordinates for each given strand of the strand feature; save the strand data of the given strand together with information identifying the intersection shape and intersection location of the second mesh; and determine the position of each strand of the strand feature in three-dimensional space in accordance with the position in three-dimensional space of the intersection shape and the intersection location of the second mesh.

The memory may further comprise instructions which, when executed by the one or more processors, cause the apparatus to: receive updated positions and orientations of the 2D shapes of the second mesh, transformed according to an animation; and update positions and orientations of the strands in accordance with the updated positions and orientations of the corresponding intersection shape and the intersection location.

The one or more processors may comprise a GPU.

According to a third aspect, the specification describes a computer readable medium storing instructions which, when executed by a processor, cause the processor to: receive a mesh representing a 3D object, the mesh comprising a plurality of 2D shapes; receive a strand feature comprising a plurality of virtual strands; and associate each strand of the plurality of virtual strands with a 2D shape of the mesh.

Associating each strand of the plurality of virtual strands with a 2D shape of the mesh may comprise: determining, for each strand, an intersection shape of the 2D shapes, with which a given strand intersects; determining an intersection location of the intersection shape corresponding to a location at which the given strand intersects the mesh; and storing information identifying the intersection shape and the intersection location together with strand data of the given strand.

The instructions, when executed by the processor, may further cause the processor to: receive updated positions and orientations of the 2D shapes of the mesh transformed according to an animation; and update positions and orientations of the strands in accordance with the updated positions and orientations of the corresponding intersection shape and the intersection location.

The instructions, when executed by the processor, may further cause the processor to: determine, for each strand, UV coordinates within the UV space of the first mesh corresponding to the intersection shape and intersection location associated with the strand; and store the UV coordinates together with the strand data of the given strand.

The mesh may be a first mesh authored with a given UV space, and the instructions, when executed by the processor, may further cause the processor to: receive a second mesh authored with the given UV space, wherein the second mesh comprises a plurality of 2D shapes and is different to the first mesh; determine an intersection shape of the second mesh and an intersection location within the intersection shape corresponding to the stored UV coordinates for each given strand of the strand feature; save the strand data of the given strand together with information identifying the intersection shape and intersection location of the second mesh; and determine the position of each strand of the strand feature in three-dimensional space in accordance with the position in three-dimensional space of the intersection shape and the intersection location of the second mesh.

The instructions, when executed by the processor, may further cause the processor to: receive updated positions and orientations of the 2D shapes of the second mesh, transformed according to an animation; and update positions and orientations of the strands in accordance with the updated positions and orientations of the corresponding intersection shape and the intersection location.

BRIEF DESCRIPTION OF THE DRAWINGS

Certain embodiments of the specification will now be described, by way of example only, with reference to the accompanying drawings in which.

DETAILED DESCRIPTION

Figure 1:
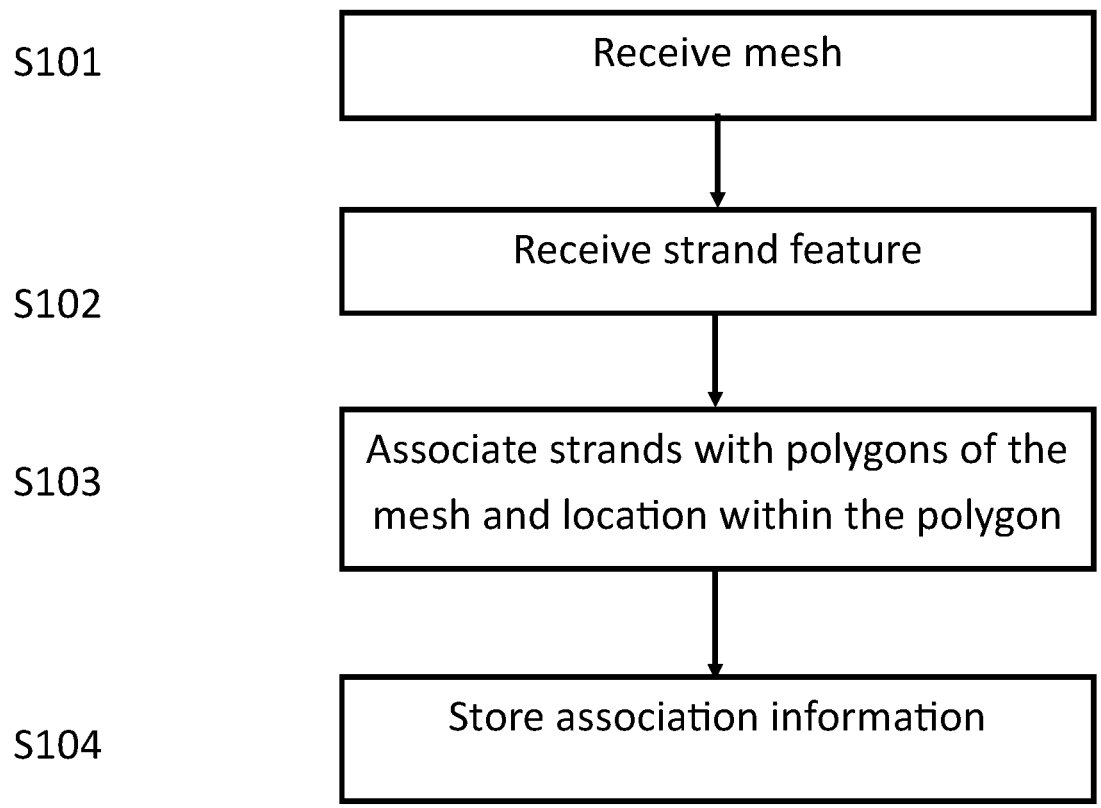
FIG. 1 is a flow chart illustrating a method of associating a strand feature with a mesh, according to embodiments of the present specification.

The present specification describes a computer implemented method in which strands representing a strand feature (e.g. a hair feature such as a beard) are associated with shapes (e.g. polygons) making up a mesh which represent a three-dimensional object (e.g. a face). This association can be used to adapt the strand feature in accordance with deformations of the mesh, or to adapt the strand feature to a second mesh, different from the first mesh. The described method is particularly advantageous in the context of video game development. For example, in the context of computer generated characters in a video game, the hair strands of a hair feature such as a beard are associated with polygons of a facial mesh. Therefore, the animation of the facial mesh provides the basis for the transformations of the hair strands of the beard, for improved realism. The association information may alternatively or additionally be used to automatically adapt the strand feature to a second mesh representing another face, or representing the same face at a lower level of detail.

A mesh, such as a polygonal mesh, may be used in computer animation to create more lifelike images. The meshes may be generated during game development and are rendered to form objects in virtual environments when the game is played by a user. In some examples, a mesh may be used to generate a computer representation of a character in a video game. The character's external features may be represented by the mesh, and the mesh is provided relative to the underlying structure (a "skeletal rig"), e.g. by "skinning" the mesh to the skeletal rig (e.g. facial rig) using known techniques. The mesh may be deformed together with the movements of the underlying skeletal rig (e.g. translations and rotations). Mesh vertices are skinned to one or more bones of the skeletal rig with a respective weight. The animation of the skeletal rig therefore drives the movement of the mesh vertices. Due to skinning of vertices to more than one bone, the vertices of the mesh may move relative to the skeletal rig. In addition, the facial features of the character may be animated in order to generate the appearance of facial expressions by animating the mesh.

In order to animate strands of a strand feature, strands may be skinned to a single bone of the skeletal rig. Skinning a strand from a pre-authored strand feature to multiple bones in the same way as the mesh vertices is often difficult, and in some circumstances may not be possible, as the necessary skinning information, such as skinning weights and bone IDs, may be difficult or impossible to extract from the strand feature. This may be the case, for example if the strand feature is authored using a commercially available authoring package. Therefore, according to the present specification, the strands are associated with points on the mesh in order to allow the strands to be driven by the mesh.

For hair features such as a character's head hair, it may not be necessary to associate the hair strands with the mesh. For example, as the mesh representing the scalp of a character is unlikely to make any transformations different from the transformations of the underlying bone corresponding to the skull of the character, any conventional approach, such as single bone skinning may be used to provide transformations of the hair relative to the head.

However, for hair strands of facial hair features such as a beard or eyebrows, or hair at the hairline of a character, by associating the strands with the facial mesh, more realistic results can be achieved. For beard strands attached to the upper and lower jawline in accordance with conventional methods, animation may produce results in which the hair strand appears in an unrealistic position relative to the facial mesh. Because the facial mesh moves relative to the skeletal rig, if the hair strands are provided at fixed offsets from bone(s) of the rig, such as the upper and lower jawline, this can result in an appearance or hair strands either disappearing inside the face of the character, or hair strands which appear to float, detached from the character's face.

By providing hair strands fixed to the mesh rather than the bones, the hair strands can be transformed according to the transformation of the facial mesh, rather than the underlying bones. Accordingly, the appearance of a character's beard will be more realistic as it will move together with the character's facial movements.

When the method described in the present specification is performed using a graphics processing unit (GPU), it has been surprisingly found that the processing costs of associating the strands with the mesh are not substantially more than skinning the strands to individual bones. Therefore, improved realism of the animation can be achieved with little increase in computational cost.

In addition, driving the strands by the mesh does not depend on the exact mechanism by which the mesh itself is animated, as the positions of the strands depend only on the positions of the corresponding mesh polygons. Therefore, the method can be used with meshes which are animated by different mechanisms, such as other than skinning to the bones of the underlying skeletal rig.

Therefore, in one aspect, the present specification describes a computer implemented method comprising receiving a mesh representing a 3D object, the mesh comprising a plurality of 2D shapes, receiving a strand feature comprising a plurality of strands, and associating each strand of the plurality of strands with a 2D shape of the mesh. The method may further include associating each strand with a particular location within a 2D shape of the mesh, where the location may be expressed in any suitable coordinate system.

FIG. 1 is a flow chart illustrating steps of the method according to an aspect of the present specification. In step S101, the method comprises receiving a mesh. The mesh represents a 3D object. For example, the method may comprise receiving a 3D mesh corresponding to the head of a computer generated character in a video game. In other examples, the 3D mesh corresponds to other objects comprising hair features. For example, the 3D mesh could correspond to an animal which may have fur as a hair feature. For example, an animal such as a dog may be represented by a polygon mesh and the strand feature may represent the fur covering the body of the animal. As a second example, an article of clothing may be represented by a polygon mesh and the hair feature may represent a feature of the textile material constituting the article of clothing, such as the hair on a fur coat.

The 3D mesh typically comprises a plurality of polygons, and the examples described herein refer to the mesh as being a polygonal mesh. In some examples, the polygons are triangles. However, it will be recognised that the mesh may comprise any two-dimensional shape on which a coordinate system can be defined that can be used to uniquely determine a location within the shape, depending on the circumstances. A mesh may be a collection of vertices, edges, and faces that define the shape and/or boundary of an object. The faces may consist of various polygonal shapes such as triangles, quadrilaterals. The faces may also be two-dimensional surfaces embedded in the three-dimensional space defined by a parametric function. The only requirement on the type of shape is that it must be possible to uniquely determine a position within it by means of coordinates.

In step S102 the method further comprises receiving a strand feature. The strand feature may be authored using an authoring package. For example, the strand feature is a hair feature such as a beard, scalp hair or eyebrows of a computer generated character. Therefore, a beard, eyebrows, or scalp hair may be authored in a particular style, or to have certain features, and includes a predetermined number of strands. In another example, the strand feature is the fur, the mane or the tail of an animal or any creature. In a third example, the strand feature is a hairy feature of textile material or article of clothing, such as a fur coat or a pelt. It will be understood that the hair feature is authored according to design considerations, and that many different parameters may be used for the authored strands such as strand length, density, shape, and/or colour in order to achieve the desired appearance of the strand feature.

In step S103 the method further comprises associating each strand of the strand feature with a polygon of the mesh. The strand may be associated with a polygon of the mesh which may be referred to herein as an "intersection polygon" (or more generically, "intersection shape"), and a location within the polygon which may be referred to herein as an "intersection location". This may comprise analyzing the authored position of the root of the strand in relation to polygons of the mesh and a location on the polygon.

For example, the method may comprise determining an intersection polygon of the mesh with which the strand directly intersects. An intersection location of the strand may be determined to correspond to a location within the intersection polygon at which the strand intersects the intersection polygon.

In some examples, an intersection polygon may be identified as being a polygon within a predetermined distance from a given strand. An intersection location may be determined for a by finding a location within the polygon nearest to the root of the strand. This may provide for strands which are close to the mesh, but which do not quite intersect the mesh to be associated with an "intersection location".

The determined intersection polygon may be identified by a numerical identifier (polygon ID). The determined intersection location may be identified by suitable numerical coordinates. The information identifying the associated intersection polygon and intersection location may be referred to herein as the "association information".

Figure 2:
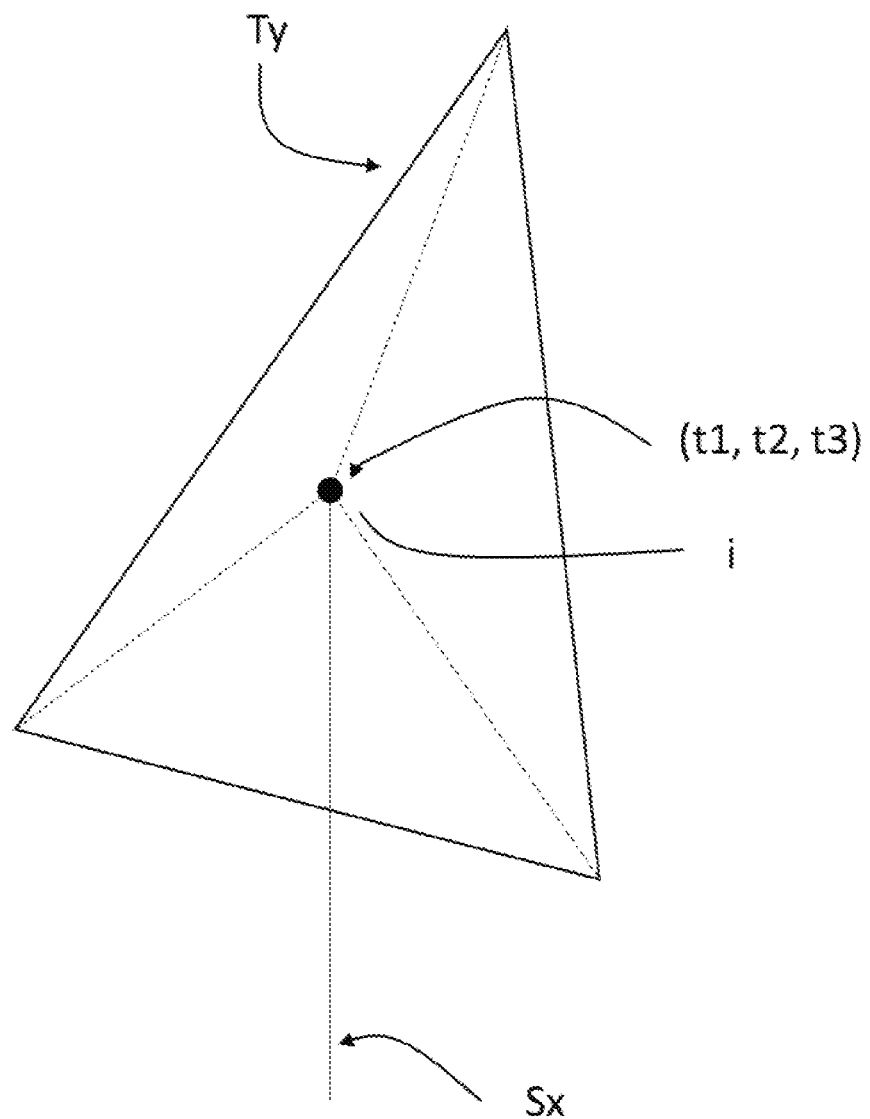
FIG. 2 illustrates a strand feature associated with a triangle of a mesh using a barycentric coordinates.

In some examples, the polygons constituting the mesh may be triangles. In this case, barycentric coordinates can be used as the coordinate system in which to express intersection locations. FIG. 2 illustrates this example, in which the strand Sx is associated with an intersection location within triangle Ty identified by the barycentric coordinates (t1, t2, t3).

In some examples, a polygon of the mesh will have a single strand of the strand feature associated with it, as shown in the example of FIG. 4. In other examples, a polygon of the mesh may have two or more strands associated with it. Where two or more strands are associated with a given polygon, each strand may have the same or different intersection location as the other strand(s) associated with the given polygon. That is, each strand has a corresponding intersection location at which it intersects the intersection polygon.

In step S104 the method further comprises storing the association information for each strand.

The steps in FIG. 1 may be performed in a pre-processing phase during development, in which case the association information may be stored on a medium, or the steps may be performed at runtime, in which case the association information may be stored in a volatile memory.

In some examples, the method comprises animating the strand feature consistently with the animation of the mesh, wherein positions and orientation of mesh polygons are transformed by the animation. Positions of the strands are updated in accordance with the positions of the corresponding polygon, causing strands to move together with the mesh. When rendered, the strands may be rendered according to the updated positions. For example, the association of the strands may occur prior to animation during gameplay, and when the mesh is animated during gameplay, the positions of the strands are continuously updated in accordance with the polygons of the mesh during the animation.

The mesh comprising a plurality of polygons can be animated such that it moves relative to the underlying rig to illustrate facial expressions. In addition, the animation of the mesh can be based on the animation of the underlying bones. The positions and orientations of the polygons of the mesh may be specified relative to positions and orientation of bones. For example, position and orientation of a polygon on the cheek of a computer generated character may be provided with a weighted combination of positions and orientations of the upper and lower jaw bones. Transformations of the upper and lower jaw bones therefore determine transformations of the polygons of the mesh depending on the weighting associated to each pair of polygon and bone. The strands of the strand feature will therefore move together with the polygons of the mesh. Therefore, realistic movement of the strand feature can be achieved, without needing to determine any association (or "skinning") between the strands and the bones. Updating the positions of strands based on an animation is described in more detail below with respect to FIG. 3.

Figure 3:
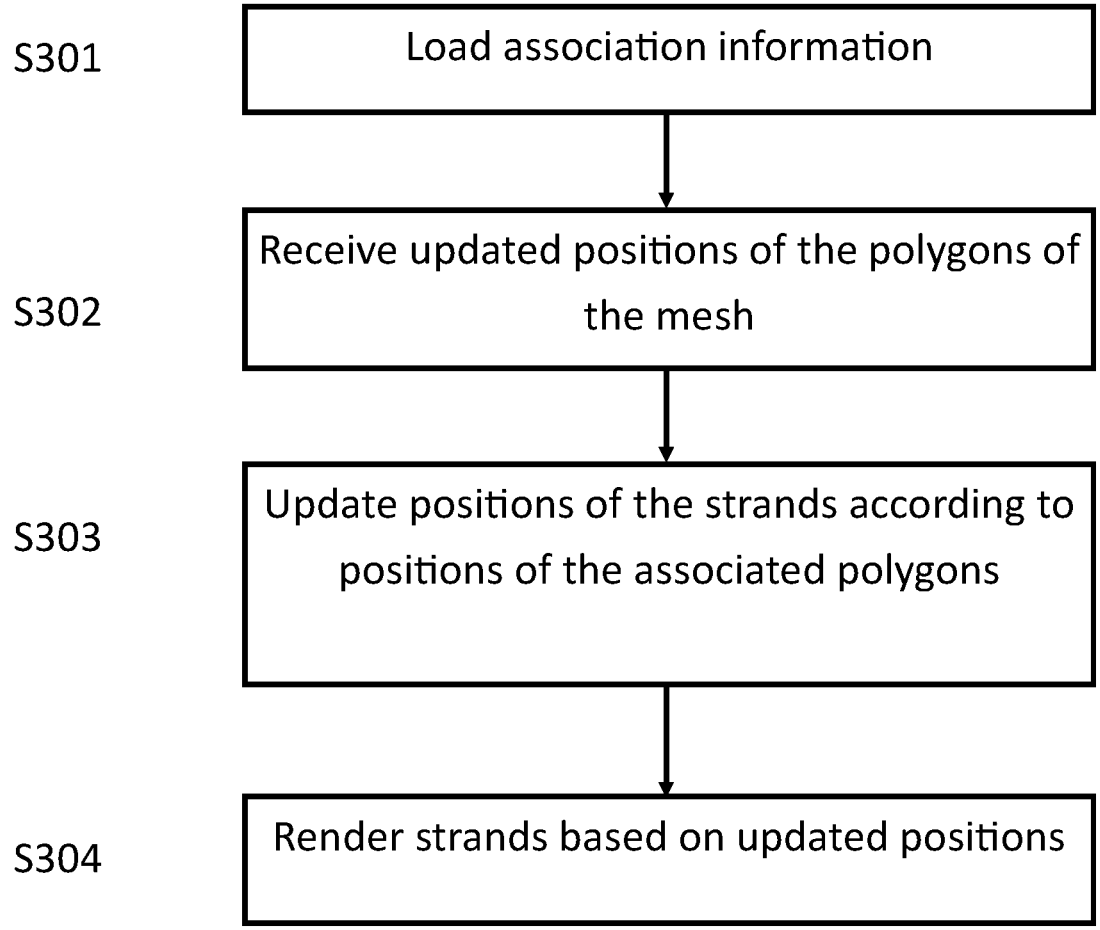
FIG. 3 is a flow chart illustrating a method to utilize the association information to update the position of the strands accordingly to the animation of the mesh.

FIG. 3 is a flow chart illustrating steps of the method according to an aspect of the present specification, relating to using the association information to adapt the strand feature to a deformation of the mesh such as one due to animation. In step S301 the association information stored for each strand is loaded from a medium or from memory. In step S302, the method comprises receiving the updated positions of the polygons of the mesh after a deformation, for example due to animation of the mesh.

In step S303, the method may comprise updating positions of the strands according to how the polygons are transformed by a deformation (such as an animation) of the mesh. Therefore, the position of the strands are updated such that they are fixed to a point on the mesh. In some circumstances, the strands may also be updated based on a physical simulation. In this case, the position of parts of the strand (typically the section closer to the root) is updated based on the position of the mesh polygon, and the position of the other parts of the strand, is determined based on a combination of a physical simulation and the updated position of the mesh polygon. In other examples, the position of the entirety of the strand is updated statically based on the updated polygon position, and the strand does not exhibit any movement relative to the updated position.

The deformation of the mesh may be any, as long as a rule is given to transform the intersection locations to new intersection locations within the deformed polygons or shapes. The positions of the strands are updated by transforming the original intersection location to an intersection location within the deformed shape using the given rule. For example, if the deformation is given by a coordinate transformation and the intersection location is expressed by coordinates from a suitable coordinate system, the new intersection location may be found by transforming the coordinates according to the transformation. In another example, if the mesh consists of triangles, the deformation transforms the original triangles into other triangles and the intersection location is identified by barycentric coordinates, then the new intersection location may be found by interpreting the same barycentric coordinates on the deformed triangles.

In step S304, the method may comprise rendering the strands based on the updated positions. Accordingly, when rendered on screen, the strand position is updated based at least in part on the position of the mesh polygon. The strand feature will therefore exhibit more realistic movements which accords with the animation of the mesh on rendering.

Compared to simply skinning the strands to single bones, it may be expected that the additional steps of the above method would be more costly in terms of processing resources. However, it has been found that, when performed on a GPU, there is little additional processing cost.

Figure 4A:
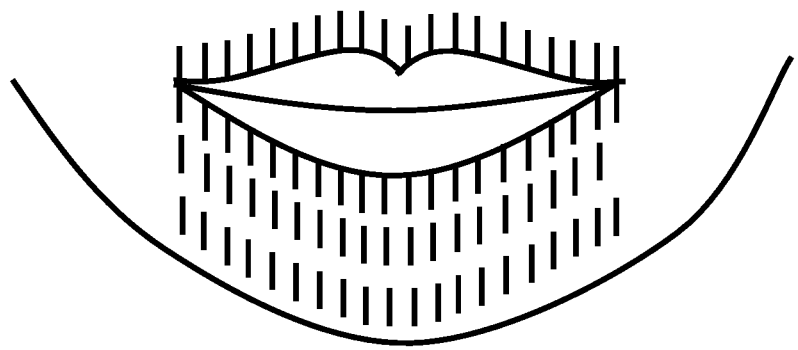
FIG. 4a illustrates strands of a beard relative to a facial mesh of a computer generated character.

An example of the difference between attaching the strands to the underlying bone compared to attaching the strands to the facial mesh is illustrated in FIG. 4. In the example of FIG. 4, part of a face of a computer generated character is illustrated. In particular, FIG. 4a illustrates the lower part of a character's face including the lower jawline and mouth, with strands representing a beard and moustache. The example is simplified in order to aid understanding. For example, it will be understood by a person skilled in the art that a strand feature such as a beard may include hundreds, thousands, or tens of hundreds of thousands of strands. A reduced number of strands is illustrated in the example of FIG. 4. FIG. 4a illustrates an example in which the strands are provided at fixed offsets to the underlying jaw. In the example of FIG. 4a, the strands nearest the lower lip are provided such that they appear below the lip line, and the strands nearest the upper lip are provided just above the upper lip line.

Figure 4B:
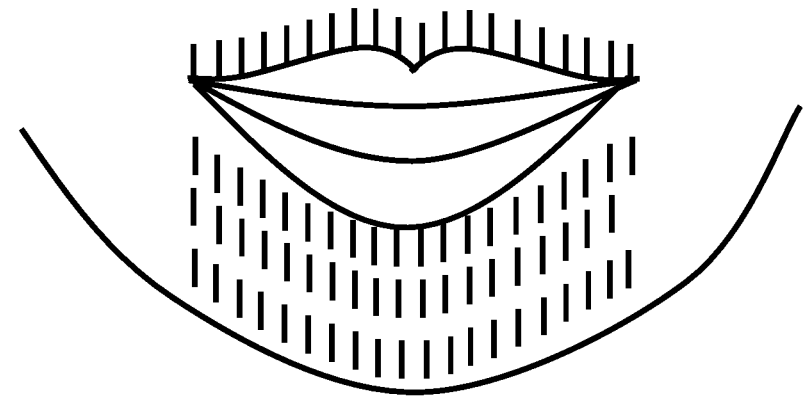
FIG. 4b illustrates animation of the mesh relative to strands that are fixed to an underlying bone.

FIG. 4b illustrates an example in which the facial mesh has been deformed in order to transform the mouth to a smile. The lower jaw has dropped relative to the upper jaw, and the beard strands below the lower lip have moved by the same amount as the lower jaw. The lips have parted compared to FIG. 4a and have moved further apart from each other. However, the corners of the mouth which are weighted between the upper and lower jaw have increased in distance from the lower jaw as the lower jaw has dropped. Therefore, the facial mesh is moved relative to the jaw and strands. As can be seen, some of the strands that previously appeared at the lower lip line now appear to be detached from the lower lip.

The example above may not be to scale. It will be recognized by those skilled in the art that movement of the mesh relative to the underlying bones may be due to the mesh vertices being skinned to more than one bone, such that mesh vertices closest to a jawbone move almost entirely together with the given jawbone. For mesh vertices midway between bones, such as in the cheek, vertices may be weighted equally between upper and lower jawbones, such that there is relative movement between the mesh vertices and the jawbones. Skinning strands to single bones at fixed offsets therefore result in beard strands being transformed by the same transformation as the bone, and this results in the beard strands appearing to move relative to the surface of the character's face in some areas. In some examples, the strands may appear to disappear inside the mesh or appear to be detached from the mesh, depending on the transformation.

Figure 4C:
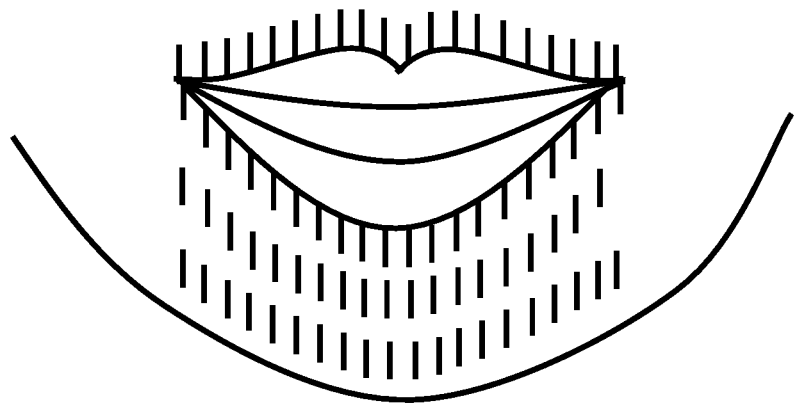
FIG. 4c illustrates animation of the mesh with strands that are fixed to the mesh.

In contrast, in the example of FIG. 4c, the strands are fixed to a point on the facial mesh. The strands provided just under the lip line are fixed to a point of the mesh just at the lip line, and therefore, the strands move together with the mouth. Accordingly, the position of the beard relative to the surface of the mesh remains fixed, resulting in more realistic appearance, and avoiding artefacts such as the strands being detached from the lip. In this example, when the computer generated character is animated to open their mouth by moving the lower jawbone, the movement of the beard strands is driven by the movement of the mesh.

Figure 5:
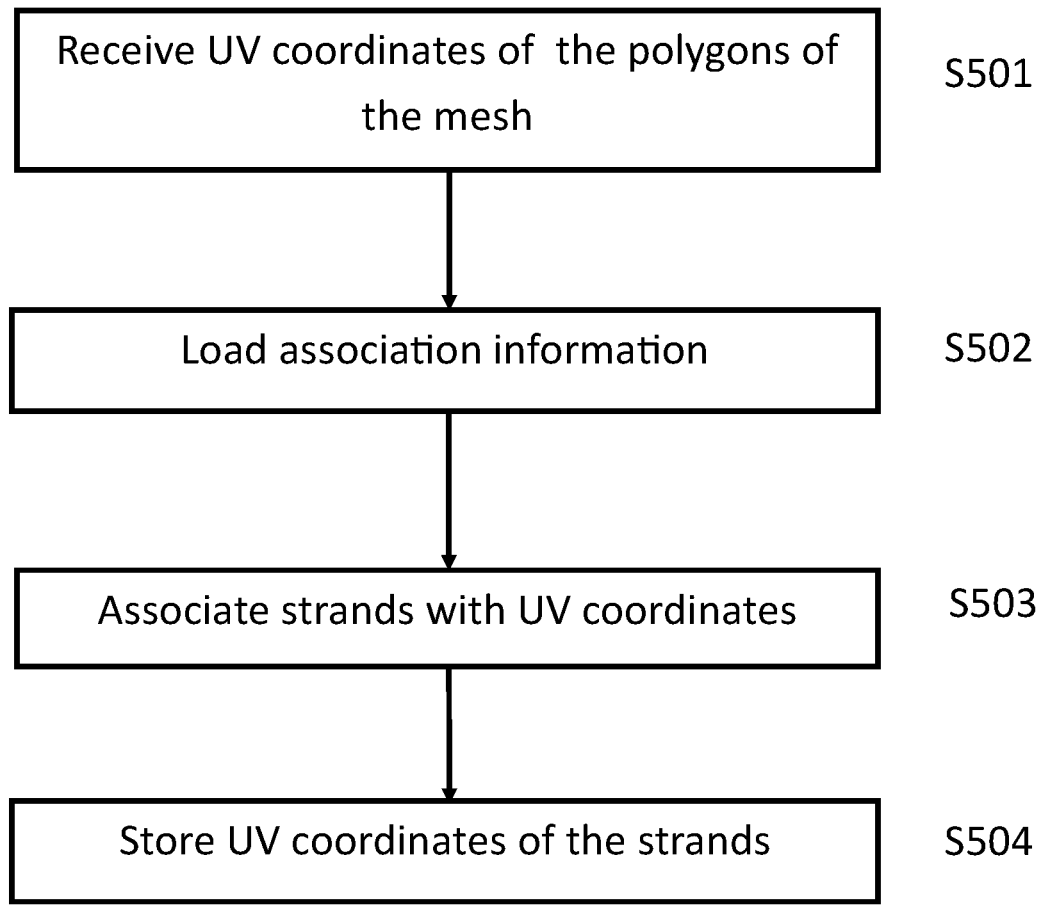
FIG. 5 is a flow chart illustrating a method of associating strands of a strand feature with UV coordinates from the UV space of a mesh.
Figure 6:
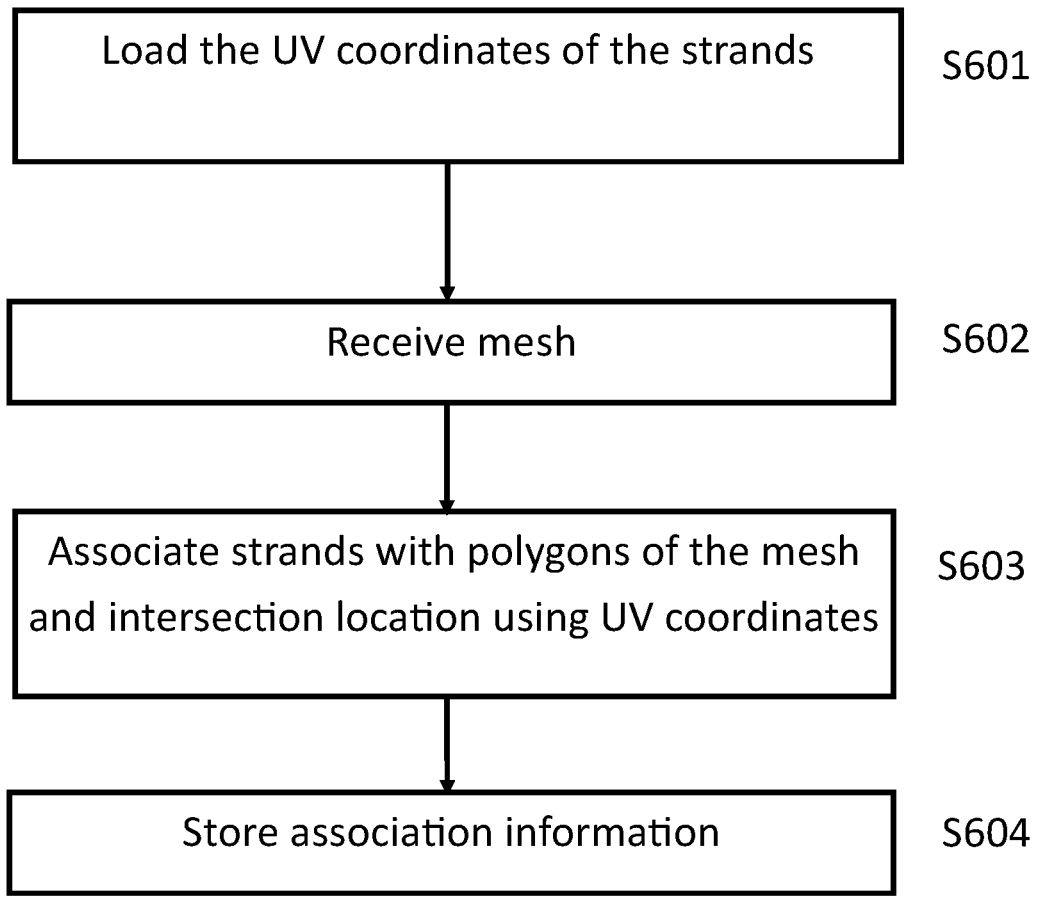
FIG. 6 is a flow chart illustrating a method to utilize the associated UV coordinates to generate association information for the strands relative to a second mesh.

The association between the strands of the strand feature and polygons of the mesh may be used to associate each strand with UV coordinates within the UV space of the mesh. The UV coordinates may be stored with the strand data and used to adapt the strand feature to a second mesh, different from the first, which is given in the same UV space of the first mesh. This aspect of the method will now be described with in more detail, with reference to FIG. 5 and FIG. 6. FIG. 5 and FIG. 6 are flow diagrams illustrating the method in accordance with aspects of the present specification.

In step S501, the method comprises receiving the UV information of a mesh, such as the mesh described with reference to FIG. 1. The UV information may be the UV coordinates of the vertices of the polygons constituting the mesh, together with an interpolation procedure to determine the UV coordinates of locations within each polygon. In step S502 stored association information (i.e. the intersection polygon and intersection location) previously computed for each strand is loaded from storage.

At step S503 of FIG. 5, the method may comprise determining, for each strand, UV coordinates corresponding to the intersection location within the intersection polygon associated with the strand. The UV coordinates identify a point within a polygon of the mesh in the UV space of the mesh, also known as the 2D texture map of the mesh.

At step S504 of FIG. 5, the method comprises storing the UV coordinates determined in step S503 together with strand data and parameters of the mesh The UV coordinates and strand data may be stored as elements in one or more arrays of data.

The steps in FIG. 5 may be performed in a pre-processing phase during development, in which case the UV coordinates and strand data may be stored on a medium, or the steps may be performed at runtime, in which case the UV coordinates and strand data may be stored in a volatile memory.

The mesh used to determine the associated UV coordinates for each strand may be referred to as a "reference mesh".

The method may further comprise using the stored UV coordinates and strand data to associate each strand with a polygon and a location within the polygon for a second mesh, different from the first mesh but sharing the same UV space. The procedure is illustrated in FIG. 6.

At step S601, the UV coordinates and strand data stored in step S504 are loaded from a medium or from memory. At step S602, a second mesh is received such as a mesh described with reference to FIG. 1, which is given in the same UV space as the first mesh. This means that UV coordinates that specify points within the first mesh can be meaningfully interpreted to specify points within the second mesh.

At step S603, for each strand in the strand feature, the corresponding UV coordinates are used to identify a point within the second mesh. The point within the second mesh is further used to determine an intersection polygon and an intersection location within the polygon for the second mesh. Therefore, each strand of the strand feature is associated to an intersection polygon and an intersection location from the second mesh (which may be referred to as association information).

At step S604, the method comprises storing the association information for each strand relative to the second mesh.

The steps in FIG. 6 may be performed in a pre-processing phase during development, in which case the association information for the second mesh may be stored on a medium, or the steps may be performed at runtime, in which case the association information may be stored in a volatile memory.

Furthermore, the method may comprise using the association information stored in step S604, together with information about position and orientation in three-dimensional space of the polygons in the second mesh, to determine the position and orientation of each strand in the three-dimensional space, so that the strand appears to be placed on the surface of the mesh.

Furthermore, the method may comprise using the steps detailed in S301-S304 to update the position in three-dimensional space of the strands according to the positions and orientations of the polygons constituting the second mesh, in order to deform (animate) the strand feature consistently with the deformation (animation) of the second mesh.

Therefore, according to aspects of the specification, the method provides for applying an authored strand feature to two or more different meshes.

In some examples, when the mesh is a first mesh authored with a given UV space, the method according to some aspects provides for the authored strand feature to be applied to a second mesh, given in the same UV space. The mesh may represent the same object as the first mesh but with a different level of detail, for example with a different number or types of polygons.

In other examples, when the mesh is a first mesh authored with a given UV space, the method provides for applying the authored strand feature to a second mesh which represent an object that is different from the one represented by the first mesh. The second mesh may be sufficiently geometrically similar to the object represented by the first mesh that the two meshes can be given in the same UV space. For example, the first mesh and the second mesh may represent the heads of two computer-generated characters, and the strand feature may represent hair authored in a certain hairstyle for the first head. The strand feature may then be automatically adapted to the second mesh according to aspects of the present specification, to realistically represent the same hairstyle on the second head.

Therefore, a library of different beards or other strand features may be generated. When designing a character, a strand feature may be selected from the library and applied to the facial mesh of the character. In some examples, main characters of a video game may have a specific hair feature authored for them which is not re-used for other characters.

In this case, the strand feature may be authored with respect a reference mesh which corresponds to the mesh used for the character. In other examples, characters of a video game other than main characters may be generated using a strand feature that may also be used on other characters.

The possibility of adapting strand features to meshes other than the reference mesh provides for improved flexibility in the use of a single authored strand feature. This therefore reduces the authoring cost of strand features, as a strand feature does not need to be individually authored for each character. In addition, authoring costs can be reduced by being able to reduce the number of individual strand features required to be authored for a plurality of characters in a video game.

Accordingly, a number of computer generated characters may be generated in which the facial appearance differs between characters, and a same beard or other hair feature may be used while maintaining a unique appearance of each character due to the individual facial shape. As the strands are associated with the mesh based on a UV coordinates, the appearance of the hair feature adapts to conform to the appearance of the face.

Figure 7:
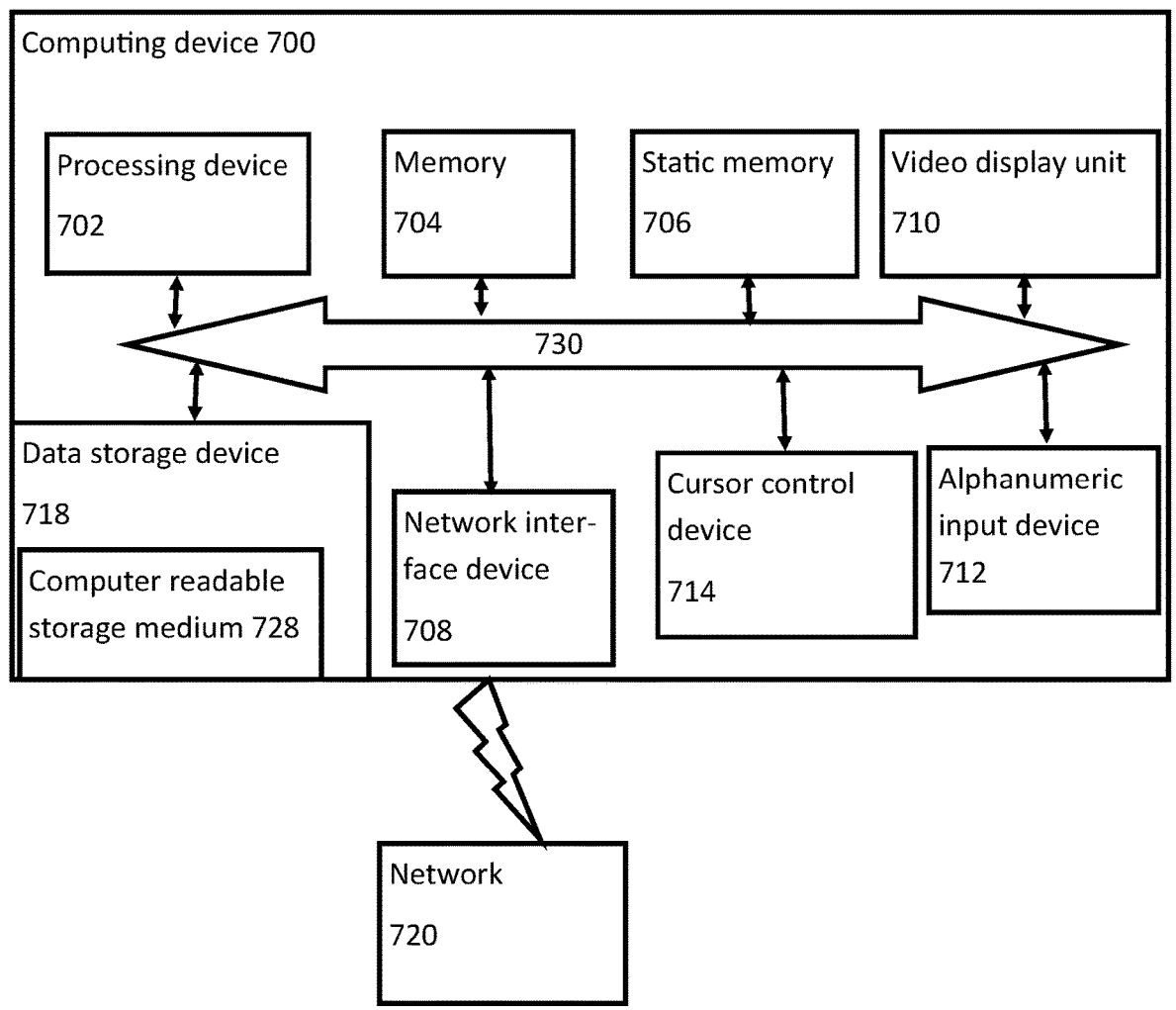
FIG. 7 illustrates an apparatus for performing processes according to embodiments of the present specification.

FIG. 7 illustrates a diagrammatic representation of a computing device 700 within which a set of instructions, for causing the machine to perform any one or more of the methodologies discussed herein, may be executed. The computing device 700 may be a computing device (e.g., a server computer) within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server machine in client-server network environment. The machine may be a personal computer (PC), a set-top box (STB), a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computing device 700 includes a processing device (e.g., a processor) 702, a main memory 704 (e.g., read-only memory (ROM), flash memory, dynamic random access memory (DRAM) such as synchronous DRAM (SDRAM)), a static memory 706 (e.g., flash memory, static random access memory (SRAM)) and a data storage device 718, which communicate with each other via a bus 730.

Processing device 702 represents one or more processing devices. In particular, the processing device 702 may comprise a graphics processing unit (GPU) capable of processing blocks of data in parallel. The processing device 702 may comprise one or more general-purpose processing devices such as a microprocessor, central processing unit, or the like. The processing device 702 may comprise a complex instruction set computing (CISC) microprocessor, reduced instruction set computing (RISC) microprocessor, very long instruction word (VLIW) microprocessor, or a processor implementing other instruction sets or processors implementing a combination of instruction sets. The processing device 702 may also comprise one or more special-purpose processing devices such as an application specific integrated circuit (ASIC), a field programmable gate array (FPGA), a digital signal processor (DSP), network processor, or the like. The processing device 702 is configured to execute the operations and steps discussed herein with respect to FIGS. 1 to 6.

The computing device 700 may further include a network interface device 708 which may communicate with a network 720. The computing device 700 also may include a video display unit 710 (e.g., a liquid crystal display (LCD) or a cathode ray tube (CRT)), an alphanumeric input device 712 (e.g., a keyboard), a cursor control device 714 (e.g., a mouse) and a signal generation device 716 (e.g., a speaker). In one embodiment, the video display unit 710, the alphanumeric input device 712, and the cursor control device 714 may be combined into a single component or device (e.g., an LCD touch screen).

The data storage device 718 may include a computer-readable storage medium 728 on which is stored one or more sets of instructions embodying any one or more of the methodologies or functions described herein with respect to FIGS. 1 to 6. The instructions may also reside, completely or at least partially, within the main memory 704 and/or within the processing device 702 during execution thereof by the computing device 700, the main memory 704 and the processing device 702 also constituting computer-readable media. The instructions may further be transmitted or received over a network 720 via the network interface device 708.

While the computer-readable storage medium 728 is shown in an example embodiment to be a single medium, the term "computer-readable storage medium" should be taken to include a single medium or multiple media (e.g., a centralized or distributed database and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present disclosure. The term "computer-readable storage medium" shall accordingly be taken to include, but not be limited to, solid-state memories, optical media and magnetic media.

In the above description, numerous details are set forth. It will be apparent, however, to one of ordinary skill in the art having the benefit of this disclosure that embodiments of the disclosure may be practiced without these specific details. In some instances, well-known structures and devices are shown in block diagram form, rather than in detail, in order to avoid obscuring the description.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here and generally, conceived to be a self-consistent sequence of steps leading to a desired result. The steps are those requiring physical manipulation of physical quantities. Usually, though not necessarily, these quantities take the form of electrical or magnetic signals capable of being stored, transferred, combined, compared and otherwise manipulated. It has been proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "receiving," "identifying," "classifying," reclassifying," "determining," "adding," "analyzing," or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

Embodiments of the disclosure also relate to an apparatus for performing the operations herein. This apparatus may be specially constructed for the required purpose, or it may comprise a general purpose computer selectively activated or reconfigured by a computer program stored in the computer. Such a computer program may be stored in a non-transitory computer readable storage medium, such as, but not limited to, any type of disk including floppy disks, optical disks, CD-ROMS and magnetic-optical disks, read-only memories (ROMs), random access memories (RAMs), EPROMs, magnetic or optical cards, flash memory, or any type of media suitable for storing electronics instructions.

The words "example" or "exemplary" are used herein to mean serving as an example, instance, or illustration. Any aspect or design described herein as "example" or "exemplary" is not necessarily to be construed as preferred or advantageous over other aspects of designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X includes A or B" in intended to mean any of the natural inclusive permutations. That is, if X includes A; X includes B; or X includes both A and B, then "X includes A and B" is satisfied under any of the foregoing instances. In addition, the articles "a" and "an" as used in this specification and the appended claims should generally be construed to mean "one or more" unless specified otherwise or clear from context to be directed to a singular form. Moreover, use of the term "an embodiment" or "one embodiment" or "an implementation" or "one implementation" throughout is not intended to mean the same embodiment or implementation unless described as such. Furthermore, the terms "first," "second," "third," "fourth," etc. as used herein are meant as labels to distinguish among different elements and may not necessarily have an ordinary meaning according to their numerical have a ordinal meaning according to their numerical designation.

The algorithms and displays presented herein presented herein are inherently related to any particular computer or other apparatus. Various general purpose systems may be used with programs in accordance with the teachings herein, or it may prove convenient to construct a more specialized apparatus to perform required method steps. The required structure for a variety of these systems will appear from the description. In addition, the present disclosure is not described with reference to any particular programming language. It will be appreciated that a variety of programming languages may be used to implement the teachings of the disclosure as described herein.

The above description sets forth numerous specific details such as examples of specific systems, components, methods and so forth, in order to provide a good understanding of several embodiments of the present disclosure. It will be apparent to one skilled in the art, however, that at least some embodiments of the present disclosure may be practiced without these specific details. In other instances, well-known components or method are not described in detail or are presented in simple block diagram format in order to avoid unnecessarily obscuring the present disclosure. Particular implementations may vary from these example details and still be contemplated to be within the scope of the present disclosure.

It is to be understood that the above description is intended to be illustrative and not restrictive. Many other embodiments will be apparent to those of skill in the art upon reading and understanding the above description. The scope of the disclosure should, therefore, be determined with reference to the appended claims, along with the full scope of equivalents to which such claims are entitled.

The invention claimed is:

1. A computer implemented method comprising:
receiving a mesh representing a 3D object, the mesh comprising a plurality of 2D shapes;
receiving a strand feature comprising a plurality of virtual strands;
associating each strand of the plurality of virtual strands with a 2D shape of the mesh, wherein associating each strand of the plurality of virtual strands with the 2D shape of the mesh includes:
determining, for each strand, an intersection shape, the intersection shape being the 2D shape of the plurality of 2D shapes of the mesh with which a given strand intersects;
determining an intersection location of the intersection shape corresponding to a location at which the given strand intersects the mesh; and
storing information identifying the intersection shape and the intersection location together with strand data of the given strand;
the method further including:
receiving updated positions and orientations of the 2D shapes of the mesh transformed according to an animation; and
updating positions and orientations of the plurality of virtual strands in accordance with the updated positions and orientations of the corresponding intersection shape and the intersection location.

2. The computer implemented method according to claim 1, wherein the 2D shapes of the mesh are triangles, and the method further comprises:
determining, for each strand, barycentric coordinates of the intersection shape which represent the intersection location.

3. The computer implemented method according to claim 1, further comprising:
determining, for each strand, UV coordinates within a given UV space of the mesh corresponding to the intersection shape and the intersection location associated with the strand; and
storing the UV coordinates together with the strand data of the given strand.

4. The computer implemented method according to claim 3, wherein the mesh is a first mesh authored with the given UV space, and the method further comprises:
receiving a second mesh authored with the given UV space, wherein the second mesh comprises the plurality of 2D shapes and is different to the first mesh;
determining an intersection shape of the second mesh and an intersection location within the intersection shape corresponding to the stored UV coordinates for each given strand of the strand feature;

saving the strand data of the given strand together with information identifying the intersection shape and the intersection location of the second mesh; and determining a position of each strand of the strand feature in three-dimensional space in accordance with the position in three-dimensional space of the intersection shape and the intersection location of the second mesh.

5. The computer implemented method according to claim 4, further comprising:
receiving updated positions and orientations of the 2D shapes of the second mesh, transformed according to the animation; and
updating positions and orientations of the plurality of virtual strands in accordance with the updated positions and orientations of the corresponding intersection shape and the intersection location.

6. The computer implemented method according to claim 1, wherein the mesh represents one of a face of a computer generated character, a body of a creature, and an article of clothing in a video game, and
wherein, when the mesh represents the face of the computer generated character, the strand feature represents at least one of a beard, hair, and a set of eyebrows of the computer generated character,
when the mesh represents the body of the creature, the strand feature represents fur of the creature, and
when the mesh represents the article of clothing or other textiles, the strand feature represents a textile material.

7. An apparatus comprising one or more processors and a memory, the memory comprising instructions that, when executed by the one or more processors, cause the apparatus to:
receive a mesh representing a 3D object, the mesh comprising a plurality of 2D shapes;
receive a strand feature comprising a plurality of virtual strands;
associate each strand of the plurality of virtual strands with a 2D shape of the mesh, wherein associating each strand of the plurality of virtual strands with the 2D shape of the mesh comprises:
determine, for each strand, an intersection shape, the intersection shape being the 2D shape of the plurality of 2D shapes of the mesh with which a given strand intersects;
determine an intersection location of the intersection shape corresponding to a location at which the given strand intersects the mesh; and
store information identifying the intersection shape and the intersection location together with strand data of the given strand:
receive updated positions and orientations of the 2D shapes of the mesh transformed according to an animation; and
update positions and orientations of the plurality of virtual strands in accordance with the updated positions and orientations of the corresponding intersection shape and the intersection location.

8. The apparatus according to claim 7, wherein the memory further comprises instructions which, when executed by the one or more processors, cause the apparatus to:
determine, for each strand, UV coordinates within a given UV space of the mesh corresponding to the intersection shape and the intersection location associated with the strand; and
store the UV coordinates together with the strand data of the given strand.

9. The apparatus according to claim 8, wherein the mesh is a first mesh authored with the given UV space, and wherein the memory further comprises instructions which, when executed by the one or more processors, cause the apparatus to:
receive a second mesh authored with the given UV space, wherein the second mesh comprises the plurality of 2D shapes and is different to the first mesh;
determine an intersection shape of the second mesh and an intersection location within the intersection shape corresponding to the stored UV coordinates for each given strand of the strand feature;
save the strand data of the given strand together with information identifying the intersection shape and the intersection location of the second mesh; and
determine a position of each strand of the strand feature in three-dimensional space in accordance with the position in three-dimensional space of the intersection shape and the intersection location of the second mesh.

10. The apparatus according to claim 9, wherein the memory further comprises instructions which, when executed by the one or more processors, cause the apparatus to:
receive updated positions and orientations of the 2D shapes of the second mesh, transformed according to the animation; and
update positions and orientations of the plurality of virtual strands in accordance with the updated positions and orientations of the corresponding intersection shape and the intersection location.

11. The apparatus according to claim 7, wherein the one or more processors comprises a GPU.

12. A non-transitory computer readable medium storing instructions which, when executed by a processor, cause the processor to:
receive a mesh representing a 3D object, the mesh comprising a plurality of 2D shapes;
receive a strand feature comprising a plurality of virtual strands;
associate each strand of the plurality of virtual strands with a 2D shape of the mesh, wherein associating each strand of the plurality of virtual strands with the 2D shape of the mesh comprises:
determine, for each strand, an intersection shape, the intersection shape being the 2D shape of the plurality of 2D shapes of the mesh with which a given strand intersects;
determine an intersection location of the intersection shape corresponding to a location at which the given strand intersects the mesh; and
store information identifying the intersection shape and the intersection location together with strand data of the given strand:
receive updated positions and orientations of the 2D shapes of the mesh transformed according to an animation; and
update positions and orientations of the plurality of virtual strands in accordance with the updated positions and orientations of the corresponding intersection shape and the intersection location.

13. The non-transitory computer readable medium according to claim 12, wherein the instructions, when executed by the processor, further cause the processor to:
determine, for each strand, UV coordinates within a given UV space of the mesh corresponding to the intersection shape and the intersection location associated with the strand; and store the UV coordinates together with the strand data of the given strand.

14. The non-transitory computer readable medium according to claim 13, wherein the mesh is a first mesh authored with the given UV space, the instructions, when executed by the processor, further cause the processor to:
receive a second mesh authored with the given UV space, wherein the second mesh comprises the plurality of 2D shapes and is different to the first mesh;
determine an intersection shape of the second mesh and an intersection location within the intersection shape corresponding to the stored UV coordinates for each given strand of the strand feature;
save the strand data of the given strand together with information identifying the intersection shape and the intersection location of the second mesh; and
determine a position of each strand of the strand feature in three-dimensional space in accordance with the position in three-dimensional space of the intersection shape and the intersection location of the second mesh.

15. The non-transitory computer readable medium according to claim 14, wherein the instructions, when executed by the processor, further cause the processor to:
receive updated positions and orientations of the 2D shapes of the second mesh, transformed according to the animation; and
update positions and orientations of the plurality of virtual strands in accordance with the updated positions and orientations of the corresponding intersection shape and the intersection location.

* * * * *